United States Patent [19]

Elliott, Jr.

[11] 4,111,846

[45] Sep. 5, 1978

[54] HYDROSOL AND CATALYST PREPARATION

[75] Inventor: Curtis Homer Elliott, Jr., Baltimore, Md.

[73] Assignee: W. R. Grace & Co., New York, N.Y.

[21] Appl. No.: 825,327

[22] Filed: Aug. 17, 1977

Related U.S. Application Data

[63] Continuation-in-part of Ser. No. 796,644, May 6, 1977, abandoned, which is a continuation of Ser. No. 596,922, Jul. 17, 1975, Pat. No. 4,022,714.

[51] Int. Cl.$^2$ .................... B01J 29/06; B01J 13/00
[52] U.S. Cl. .................... 252/455 Z; 252/313 S; 252/455 R
[58] Field of Search .................... 252/454, 455 Z, 453, 252/455 R, 313 S

[56] References Cited

U.S. PATENT DOCUMENTS

| | | | |
|---|---|---|---|
| 2,232,727 | 2/1941 | Peterkin et al. | 252/453 X |
| 3,244,639 | 4/1966 | Mimdick et al. | 252/313 S |
| 3,252,917 | 5/1966 | Mimdick et al. | 252/313 S |
| 3,401,125 | 9/1968 | Jaffe | 252/453 X |
| 3,556,988 | 1/1971 | Stover et al. | 252/453 X |

*Primary Examiner*—Carl Dees
*Attorney, Agent, or Firm*—Arthur P. Savage

[57] ABSTRACT

Titania-alumina-silica hydrosols are prepared by reacting titanium and aluminum salts with an alkaline metal silicate solution at a pH of about 3. The hydrosol compositions may be dried to form inorganic-titania-alumina-silica gels or the hydrosols may be used as inorganic binders for the preparation of catalyst compositions which may contain clay and zeolites.

15 Claims, 1 Drawing Figure

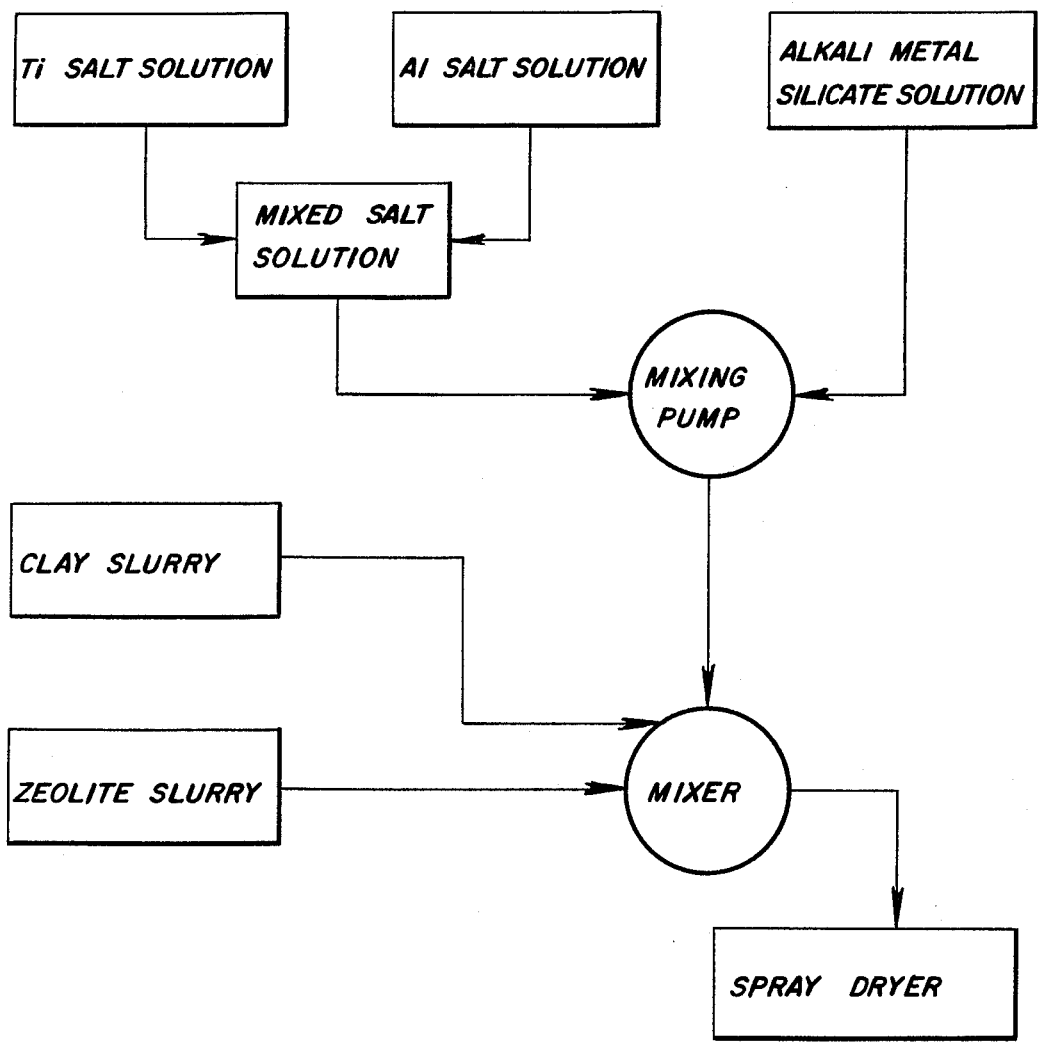

HYDROSOL AND CATALYST PREPARATION

This application is a continuation-in-part of my application Ser. No. 796,644 filed May 6, 1977 and now abandoned which is a continuation of application Ser. No. 596,922 filed July 17, 1975, now U.S. Pat. No. 4,022,714.

This application relates to the preparation of inorganic hydrosols and more particularly to titania-alumina-silica hydrosols which find utility as binders for catalytic compositions.

Catalyst compositions used for the conversion of hydrocarbons comprise finely divided inorganic materials such as clay and crystalline aluminosilicate zeolites bound together into discrete particles which may range from about 20 microns to 6 millimeters in size. These catalyst particles must have a pore structure which permits entry of reactant molecules into the catalyst particle. At the same time the catalyst particles must have physical strength and density characteristics which permit their extended use under commercial hydrocarbon processing conditions. In the past many methods have been suggested for the preparation of commercially useful hydrocarbon conversion catalysts which in some instances contain hydrosol binders.

U.S. Pat. No. 3,867,308 to Elliott describes the preparation of petroleum cracking catalysts wherein a composite of clay and zeolite is bound together with an acidic silica hydrosol.

U.S. Pat. No. 3,957,689 to Ostermaier et al. discloses a process for preparing catalysts in which a buffered silica-alumina hydrosol is combined with clay and zeolite and subsequently spray dried.

U.S. Pat. No. 4,022,714 to Elliott describes a titania or zirconia-silica hydrosol which is used in the preparation of zeolite/clay containing cracking catalysts.

It is an object of the present invention to provide an improved inorganic hydrosol which may be used as a binder in the manufacture of catalyst compositions.

It is a further object to provide a hydrosol binder which may be used to prepare dense physically strong composites of clay and zeolites.

These and still further objects of the present invention will become clearly apparent to one skilled in the art in the following detailed description and drawing wherein the figure sets forth a flow diagram of the process used to prepare hydrosol in catalyst compositions as the present invention.

Broadly my invention contemplates an inorganic hydrosol composition which comprises titania-alumina-silica hydrosol dispersed in aqueous media, and catalytic compositions which utilize the hydrosol as a binder. More specifically, I have found that a titania-alumina-silica hydrosol which is particularly useful for the preparation of bound clay/zeolite catalyst compositions may be prepared by combining mixed acid salt solutions of titanium and aluminum with alkali metal silicate solutions to form hydrosols having a pH of from about 2.5 to 3.5. The weight ranges of titania, alumina, silica and water in the hydrosol expressed in terms of parts by weight $H_2O$, $TiO_2$ and $Al_2O_3$ per part by weight $SiO_2$ are as follows:

$H_2O$ = 6 to 25 parts per part $SiO_2$
$TiO_2$ = 0.01 to 0.12 parts per part $SiO_2$
$Al_2O_3$ = 0.01 to 0.15 parts per part $SiO_2$ When the hydrosol binder is converted to a dried gel product, it contains the following amount of $SiO_2$, $TiO_2$ and $Al_2O_3$ expressed as percent by weight on a dry basis:

$SiO_2$ = 78 to 98
$TiO_2$ = 1 to 10
$Al_2O_3$ = 1 to 12

When the presently contemplated hydrosols are used to prepare zeolite/clay containing catalytic cracking catalysts, from about 15 to 35% by weight (dry basis) of the hydrosol is combined with from about 5 to 60% by weight zeolite and from about 5 to 80% by weight clay or other weighting agents such as alumina, silica-alumina, and silica.

The titanium salts used in the preparation of the hydrosols are soluble titanium salts, preferably soluble titanyl sulfate having the formula:

$$TiOSO_4 \cdot H_2SO_4 \cdot 8H_2O \text{ or } Ti(SO_4)_2 \cdot 9H_2O$$

The aluminum salt is preferably acid aluminum salts such as aluminum sulfate. The alkali metal silicate used in the preparation of the hydrosols is preferably sodium silicate which has a composition from 3.36 to 2.5 $SiO_2$:$Na_2O$ which may contain from about 5 to 20% by weight of the aforementioned sodium silicate dissolved in water.

The catalysts which may be prepared using the presently contemplated hydrosols may contain crystalline aluminosilicates such as type Y zeolite, or modified forms of type X and type Y zeolite which may be thermally treated and exchanged with rare earth ions as disclosed in U.S. Pat. Nos. 3,402,996, 3,607,043, or 3,676,368. Furthermore, the zeolite may be thermally stabilized as shown in U.S. Pat. Nos. 3,293,192 or 3,449,070. The catalysts in addition to zeolite may contain weighting agents such as clay which may be kaolin, metakaolin, or halloysite. Furthermore, the weighting agent may include inorganic oxides such as alumina, and silica-alumina.

The catalysts prepared by the process disclosed herein are particularly useful for the processing or converting of petroleum hydrocarbons. Typically, these catalytic cracking catalysts are used in fluid or fixed bed cracking processes wherein a hydrocarbon feedstock is contacted with the catalyst at a temperature of from about 700° to 1000° F. Furthermore the presently contemplated titania-alumina-silica hydrosol binders find application in the preparation of other hydrocarbon conversion catalysts such as hydrocracking catalysts, isomerization catalysts, and reforming catalysts as well as auto exhaust oxidation catalysts. The hydrosol binders may be combined with alumina to form extrudates, beads, and pills that may be used as supports for a variety of catalysts. It is also contemplated that the hydrosols may be spray dried to form hard attrition resistant composites of titania-alumina-silica possessing ion exchange capability.

A typical process which may be utilized to prepare the hydrosols in catalysts of the present invention is set forth in the drawing. Reference to the drawing reveals that the source of titanium salt solution which typically has a concentration of from about 1% to 10% by weight $TiO_2$ in water is connected to a mixed salt tank. Also connected to the mixed salt tank is a source of aluminum salt solution which has a concentration of from about 1 to 8 $Al_2O_3$ % by weight in water. The mixed salt tank is connected to a mixing pump. A source of alkali metal silicate solution is also connected to the mixing pump.

The alkali metal silicate solution typically has a concentration of from about 5 to 20% by weight alkaline metal silicate in water. The mixed titanium and aluminum salt solution, and alkaline metal silicate solution are metered to the mixing pump in amounts which provide the desired ratios of $H_2O$, $TiO_2$, and $Al_2O_3$ to $SiO_2$ indicated above. The pH of the hydrosol is maintained at closely regulated levels of from about 2.5 to 3.5. In general it is found that the mixed titania aluminum salt solution will possess a pH of about 0.7 to 2.2 and the alkali metal silicate solution will have an initial pH of from about 11.3 to 12.0. In general it is preferred to maintain the hydrosol at a temperature of from about 60° to 75° F. prior to use. It is found that the hydrosol is relatively stable at these temperatures and may be held for a period of from about ¼ to 1 hour prior to utilization.

In the embodiment shown in the drawing the hydrosol is prepared in the mixing pump and then conducted to the mixer, preferably a high shear mixer. Also connected to the mixer are sources of clay slurry and zeolite slurry. The clay slurry will typically comprise kaolin slurried in water in amounts where from about 25 to 35% by weight kaolin is contained in the slurry. The zeolite slurry will typically contain from about 20 to 30 weight percent zeolite mixed in water. The zeolite may be slurry pH adjusted to pH = 3.8–4.5 with mineral acid. In the process shown in the drawing the clay and zeolite slurries are metered into the mixer along with a hydrosol feed stream from the mixing pump. The hydrosol, clay and zeolite are continuously mixed in the mixer and then fed to a spray drier wherein the hydrosol-clay-zeolite slurry is dried. Typically the spray drier is operated at an inlet gas temperature of from about 600° to 900° F. and the gas outlet temperature of from about 300° to 400° F. The spray dried catalyst product will typically possess a particle size range of from about 20 to 300 microns. Subsequent to spray drying the catalyst composite is washed with water to remove soluble salts and may subsequently be exchanged with catalytically active or stabilizing ions such as rare earth.

The catalyst composites prepared by way of the present invention are found to possess a tough uniform homogeneous structure which is particularly attrition resistant. Furthermore, the catalyst composites will possess a surface area of from about 150 to 225 m²/g and a water pore volume of from about 0.20 to 0.30 cc/g. and a nitrogen pore volume of 0.08 to 0.15 cc/g.

Having described the basic aspects of the present invention the following examples are given to illustrate the specific embodiments thereof. In the examples the Davison Attrition Index (D.I.) was determined as follows:

A 7 g. sample is screened to remove particles in the 0 to 20 micron size range. The particles above 20 microns are then subjected to a 5 hour test in the standard Roller Particle Size Analyzer using a 0.07 inch jet and 1 inch I.D. U-Tube as supplied by American Instrument Company, Silver Spring, MD. An air flow of 21 liters per minute is used. The Davison Index is calculated as follows:

$$\text{Davison Index} = \frac{0 - 20 \text{ micron material formed during test}}{\text{Original 20 + micron fraction}} \times 100$$

The catalysts were evaluated by comparing the activity of these catalysts with the activity of a standard catalyst containing rare earth faujasite. In this comparison both catalysts are subjected to the standard activity test described by Ciapetta and Henderson in the Oil and Gas Journal of Oct. 16, 1967 at pages 88 to 93.

EXAMPLE I

Using a system similar to that shown in the drawing, 19.49 lbs. of mixed titanium sulfate-aluminum sulfate mixed salt solution containing as oxides 3.85 Wt. percent $TiO_2$ and 3.89 Wt. percent $Al_2O_3$ was continuously introduced to mixing pump 1. Simultaneously, 80.51 lbs. of sodium silicate of 18°Be gravity and 3.36 $SiO_2/Na_2O$ ratio was continuously introduced to mixing pump. The two flowing streams reacted in the mixing pump and a hydrosol of 3.05 pH was continuously produced and collected.

One hundred pounds of hydrosol was transferred to a high speed mixer. While the hydrosol was being stirred, 32.6 lbs. of dry commercial KCS clay and 8.9 lbs. (dry basis) synthetic Na-Y faujasite as an aqueous slurry of 4.0 pH containing 33 percent solids were added. The composite mixed aqueous slurry of titania-alumina-silica hydrosol, KCS clay and synthetic Y faujasite was pumped to a commercial spray dryer having a rotating dispersing vane which rotated at 11,850 rpm and was dried at a dryer gas inlet temperature of 625° F. and a gas outlet temperature of 350° F. The spray dried material was washed with hot water to remove the sodium sulfate, exchanged with rare earth chloride solution, water washed and dried. The resulting catalyst had the properties set forth in the Table.

EXAMPLE II

In a manner similar to Example I, 21.44 lbs. of mixed titanium sulfate-aluminum sulfate mixed salt solution containing as oxides 3.85 Wt. % $TiO_2$ and 3.89 Wt. % $Al_2O_3$ was continuously reacted with 78.56 lbs. of sodium silicate of 20°Be gravity and 3.36 $SiO_2/Na_2O$ ratio in the mixing pump to form a hydrosol of 3.05 pH.

One hundred lbs. of mixed hydrosol was transferred to a high speed mixer. While the hydrosol was being stirred, 35.6 lbs. of dry commercial KCS kaolin clay and 9.7 lbs. (dry basis) synthetic Na-Y faujasite as an aqueous slurry of 4.0 pH containing 35 Wt. % solids were added.

The composite mix of hydrosol, KCS clay and synthetic Y faujasite was pumped to a commercial spray drier and dried at a dryer gas inlet of 625° F. and a gas outlet temperature of 350° F. The spray dried material was washed with hot water to remove the sodium sulfate, exchanged with rare earth chloride solution, water washed and dried.

The properties of the catalyst are set forth in the Table.

TABLE

| Example | I | II |
|---|---|---|
| Total Volatiles % by Wt. | 10.11 | 10.53 |
| $Al_2O_3$, Wt. % (dry basis) | 33.80 | 33.85 |
| $Re_2O_3$, Wt. % (dry basis) | 3.20 | 3.42 |
| $Na_2O$, Wt. % (dry basis) | 0.55 | 0.39 |
| $SO_4$, Wt. % (dry basis) | 0.11 | 0.03 |
| $TiO_2$, Wt. % (dry basis) | 2.97 | 2.98 |
| Surface Area (m²/g) | 179 | 168 |
| Pore Volume (N), (cc/g) | 0.12 | 0.11 |
| Pore Diameter | 26 | 26 |
| Pore Volume ($H_2O$), (cc/g) | 0.24 | 0.24 |
| D.I. | 3 | 5 |
| J.I. | 0.1 | 0.7 |
| Average Bulk Density (g/cc) | 0.77 | 0.79 |
| Average particle Size (microns) | 60 | 78 |
| Microactivity after steaming at 1350° F. | | |
| Sample, % conversion | 81.2 | 81.5 |

TABLE-continued

| | | |
|---|---|---|
| Standard, % conversion | 75.0 | 75.0 |
| Binder | | |
| Wt. % $Al_2O_3$ | 6.5 | 6.8 |
| Wt. % $TiO_2$ | 6.5 | 6.8 |
| Wt. % $SiO_2$ | 87.0 | 86.4 |
| Catalyst | | |
| Wt. % Binder | 24.8 | 24.0 |
| Wt. % Clay | 58.8 | 57.6 |
| Wt. % Na-Y Zeolite | 16.4 | 18.4 |
| After 1 Hour at 1500° F Thermal Pretreat of Sample | | |
| D.I. | 2 | 6 |
| J.I. | 0.9 | 0.2 |
| Average Bulk Density (g/cc) | 0.83 | 0.84 |
| Peak Height | | |
| 1000° F. | 56 | 57 |
| 1600° F. | 50 | 51 |
| Microactivity at 1350° F. | | |
| Sample, % conversion | 77.9 | 78.6 |
| Standard, % conversion | 69.9 | 69.9 |

EXAMPLE III

A sample of spray dried hydrosol was prepared as follows:

23.0 lbs. of mixed titanium sulfate-aluminum sulfate solution containing as oxides 2.81 Wt percent $TiO_2$ and 3.75 Wt. percent $Al_2O_3$ was continuously reacted with 83.15 lbs. of sodium silicate of 18°Be gravity and 3.36 $SiO_2/Na_2O$ ratio in a mixing pump to form a hydrosol of 3.0 pH.

The 106.15 lbs. of mixed hydrosol was pumped to a commercial spray drier and dried at a dryer gas inlet of 625° F. and a gas outlet temperature of 350° F. The spray dried material was washed with hot water to remove sodium sulfate and dried. The dried titania-alumina-silica compound had the following chemical analysis and physical properties.

| | |
|---|---|
| $TiO_2$ Weight % (dry basis) = 7.17% | Bulk Density = 0.58 g/cc |
| $Al_2O_3$ Weight % (dry basis) = 9.62% | Surface Area = 200 m²/g |
| $SiO_2$ Weight % (dry basis) = 82.15% | P.V. ($H_2O$) = 0.22 cc/g |
| $Na_2O$ Weight % (dry basis) = 0.31% | P.V. ($N_2$) = 0.11 cc/g |
| $SO_4$ Weight % (dry basis) = 0.75% | |

EXAMPLE IV

In a manner similar to Example III, 68.3 lbs. of mixed titanium sulfate-aluminum sulfate solutions containing as oxides 1.29 Wt. percent $TiO_2$ and 1.32 Wt. percent $Al_2O_3$ was continuously reacted with 74 lbs. of sodium silicate of 16.5°Be gravity and 3.36 $SiO_2/Na_2O$ ratio in the mixing pump to form a hydrosol of 3.15 pH.

The 142.3 pounds of mixed hydrosol was pumped to a commercial spray dryer and dried at a dryer gas inlet of 600° F. and a gas outlet temperature of 350° F. The spray dried material was washed with hot water to remove sodium sulfate, exchanged with rare earth chloride solution, water washed and dried.

The product had a surface area of 220 m²/g, contained 5.84 Wt. percent (D.B.) $Re_2O_3$ and had a catalytic activity of 14.4 percent conversion compared to a standard catalyst activity of 71.4 percent conversion.

This behavior indicates the dried matrix possesses some catalytic activity as well as cation exchangeability.

The above examples clearly indicate that the hydrosols of the present invention may be used to prepare valuable cracking catalyst compositions.

I claim:

1. A titania-alumina-silica hydrosol which comprises the following amounts by weight $TiO_2$, $Al_2O_3$, $SiO_2$ and $H_2O$:
   (a) 0.01 to 0.12 parts $TiO_2$ per part $SiO_2$,
   (b) 0.01 to 0.15 parts $Al_2O_3$ per part $SiO_2$, and
   (c) 6 to 25 parts $H_2O$ per part $SiO_2$,
said hydrosol having a pH of from about 2.5 to 3.5.

2. The hydrosol of claim 1 wherein said $TiO_2$ is derived from soluble titanium sulfate and said $Al_2O_3$ is derived from aluminum sulfate.

3. The hydrosol of claim 1 which is obtained by combining an aqueous solution of a titanium salt and an aluminum salt with a solution of alkali metal silicate.

4. The hydrosol of claim 3 wherein said alkali metal silicate is sodium silicate.

5. A particulate titania-alumina-silica dried sol product having the composition expressed as percent by weight $SiO_2$, $TiO_2$ and $Al_2O_3$ as follows:
   (a) $SiO_2$ - 78 to 98,
   (b) $TiO_2$ - 1 to 10, and
   (c) $Al_2O_3$ - 1 to 12
said product being prepared by drying the hydrosol of claim 1.

6. A process for preparing hydrocarbon conversion catalysts which comprises:
   (a) preparing an aqueous slurry of a crystalline aluminosilicate zeolite and a titania-alumina-silica hydrosol binder, said hydrosol binder comprising the following amounts by weight $TiO_2$, $Al_2O_3$, $SiO_2$ and $H_2O$:
      (1) 0.01 to 0.12 parts $TiO_2$ per part $SiO_2$,
      (2) 0.01 to 0.15 parts $Al_2O_3$ per part $SiO_2$, and
      (3) 6 to 25 parts $H_2O$ per part $SiO_2$
   said hydrosol having a pH of from about 2.8 to 3.2; and
   (b) spray drying said slurry to form discrete catalyst particles.

7. The process of claim 6 wherein said slurry has a pH of about 3.0 to 3.9 prior to drying.

8. The process of claim 7 wherein the slurry is maintained at a temperature of from about 65° to 75° F. prior to drying.

9. The process of claim 8 wherein said slurry is spray dried to obtain a catalyst having a particle size of from about 20 to 300 microns.

10. The process of claim 9 wherein said catalyst is washed to remove soluble impurities.

11. The process of claim 10 wherein said catalyst is exchanged with a solution of rare earth cations.

12. The process of claim 6 wherein said zeolite is a type Y zeolite having a silica to alumina ratio of about 3.5 to 5.5.

13. The process of claim 6 wherein the catalyst contains from about 5 to 60% by weight zeolite, from about 0 to 80% by weight clay, from about 15 to 35% by weight hydrosol binder, and from 0 to 30% by weight alumina.

14. The catalysts prepared by way of the process of claim 6.

15. The catalysts prepared by way of the process of claim 13.